Oct. 27, 1942.  E. A. EDWARDS  2,299,884
RELAY VALVE
Filed Jan. 9, 1942
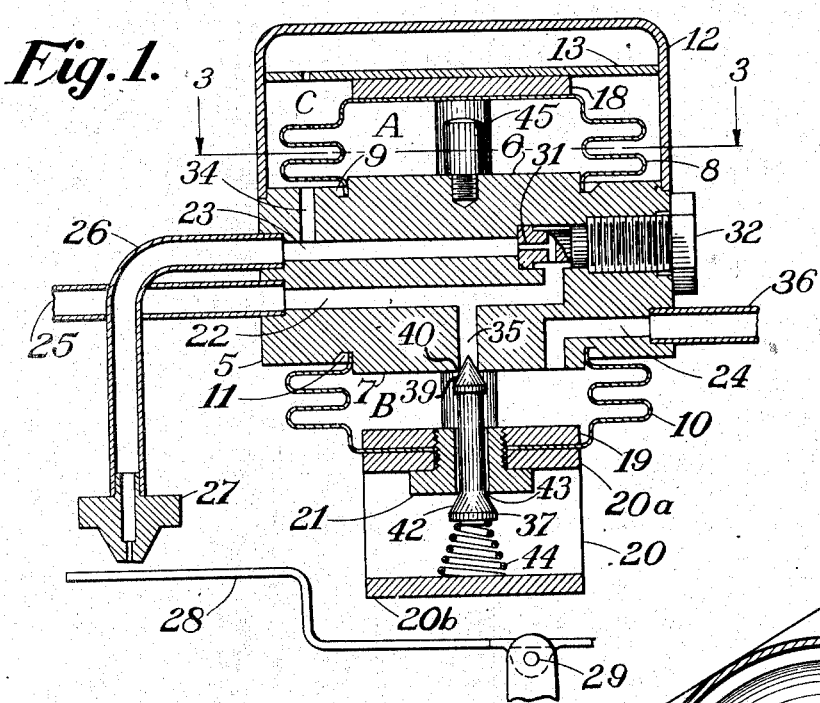
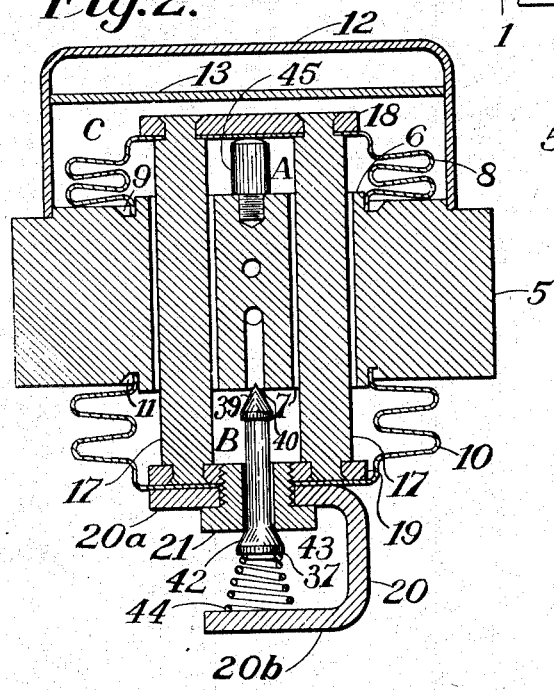
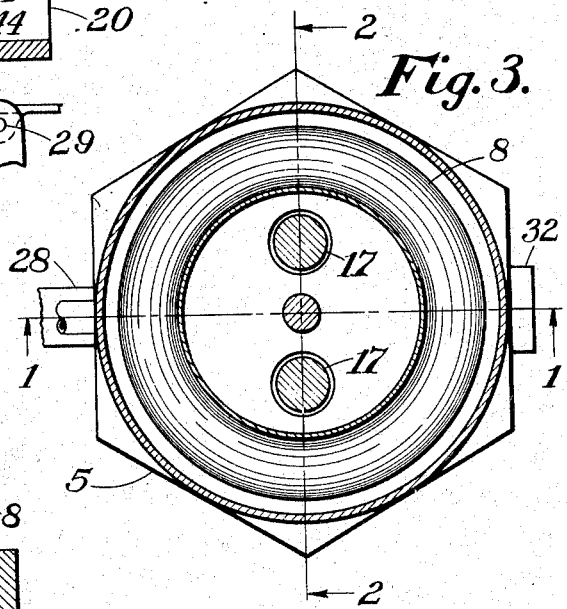
INVENTOR.
E. A. EDWARDS
BY D. Clyde Jones
ATTORNEY.

Patented Oct. 27, 1942

2,299,884

UNITED STATES PATENT OFFICE 2,299,884

RELAY VALVE

Evan A. Edwards, Cambridge, Mass., assignor to Taylor Instrument Companies, Rochester, N. Y., a corporation of New York Application January 9, 1942, Serial No. 426,213

9 Claims. (Cl. 137—153)

This invention relates to relay valves and the like.

The present invention has for its purpose the production of a relay valve of the low leak type which will be relatively simple in construction and yet reliable in operation.

The various features and advantages of the invention will appear from the detailed description and claims when taken with the drawing in which Figs. 1 and 2 are vertical sections of the valve taken respectively on the lines 1—1 and 2—2 of Fig. 3; and Fig. 3 is a horizontal section of the valve taken on the line 3—3, looking in the direction of the arrows.

The valve includes the body 5, herein illustrated as a block of material preferably of metal, is hexagonal in cross section. It will be understood, however, that this body may be made in any other convenient shape, for example, it may have any other polygonal or even cylindrical cross-section. The body 5 has opposed end surfaces 6 and 7, being respectively the upper and lower ends, as viewed in Figs. 1 and 2. An inverted primary bellows 8 has its rim sealed in a recess 9 in the upper end of the body to provide a primary bellows chamber A, while a secondary bellows 10 has its rim sealed in a recess 11 in the lower end 7 of the body to provide a secondary bellows chamber B. Bellows 8 has a greater effective area than bellows 10, which may result from having bellows 8 of larger diameter than bellows 10, or from using bellows which are alike within manufacturing tolerances but arranging the assembly so that the bellows 10 is always extended more than bellows 8 when the valve stem 37 is closing both of its related seats, as will be described. An inverted cap 12 of rigid metal has its rim sealed to the upper surface 6 of the body. This cap provides an external bellows chamber C for the bellows 8. The cap 12 has a circular stop plate 13, sealed therein in spaced relation to the closed end thereof to provide a capacity or reservoir. A small opening in this plate places the reservoir in restricted communication with the exterior bellows chamber C.

The body has two spaced parallel bores extending through the ends 6 and 7 thereof so that the primary bellows chamber A and the secondary bellows B communicate with each other. These bores are adapted to receive the yoke rods 17. The upper ends of these rods pass through perforations in the bellows 8, being riveted to the reenforcing bellows plate 18 to hold it against the outer flat surface of this bellows cup and to seal the perforation in this cup. The lower ends of the yoke rods 17 are similarly riveted in openings in the reenforcing bellows plate 19, clamped against the inner surface of the bottom of the bellows cup, as will be described. The yoke rods 17 thus cause the bellows 8 and 10 to operate as a unit, the resilience of these bellows normally biasing this unit in the direction of the stop plate 13. A lug 45, screwed into the upper end of the valve body limits the movement of the unit in the reverse direction. It should be pointed out that the stop plate 13 and lug 45 are limiting stops only since in normal operation the primary bellows operates in an intermediate position between them. A U-shaped bracket 20 has one of its arms 20a of an area substantially equal to that of the reenforcing plate 19. This arm and the plate, as well as the bottom of the bellows therebetween, have registering openings facing in a direction parallelling the long axes of the yoke rods 17, to receive a hollow cap nut 21 threaded therein for clamping these parts together.

The body has an inlet passageway 22, a control passageway 23 and an outlet passageway 24 opening through its side. The inlet passageway 22 communicates with the conduit 25 which is connected to a pressure fluid source, such as compressed air, while the control passageway 23 communicates through a conduit 26 with a nozzle 27. This nozzle and the baffle 28 cooperate as a control couple, the baffle 28 being pivoted at 29 for movement with respect to the nozzle in accordance with a deviation in a variable condition. Any suitable condition sensing means (not shown) may be used to move the baffle. The control passageway 23 and the inlet passageway 22 communicate through an orifice 31 in a plug 32 screwed into the body 5. The control passageway also communicates with the external bellows chamber C through the opening 34 in the body. The inlet passageway also communicates with the interior of the secondary bellows chamber B through a branch passageway 35 in alinement with the bore through the cap nut 21. The outlet passageway 24 leads from the secondary bellows chamber through a conduit 31 to a diaphragm motor valve or other device (not shown), to be controlled by the present pilot or relay valve.

A valve stem 37 is mounted for longitudinal movement in the bore through the cap nut 21. This valve stem is provided at its upper end with a closure portion 39 to engage the seat 40 defining the inlet port from the branch passageway 35 and is provided at its lower end with a closure portion 42 to engage the seat 43 defining the exhaust port through the cap nut. A spring 44 is interposed between the lower end of the valve stem and the arm 20b of the bracket. By this arrangement the valve stem is normally urged upward in a direction so that its closure portions 39 and 42 tend to engage the seats 40 and 43 respectively.

While the present relay valve is in use, it is connected through conduit 25 with a source of compressed air or other pressure fluid. This compressed air passes through the passageway 22, orifice 31, control passageway 23, conduit 26 and nozzle 27, where it escapes under the control of the baffle 28. It has been mentioned that the baffle is moved by suitable condition sensing means (not shown) to vary the baffle-nozzle relation.

Let it be assumed that the baffle 28 approaches the nozzle. The air pressure in control passageway 23 and consequently in the external bellows chamber C will be increased. This causes the bellows unit, including the primary bellows and the secondary bellows to move downward. As a result of this movement the seat 43 on the cap nut engages the closure portion 42 on the valve stem thereby moving this valve stem downward. The downward movement of the valve stem moves the closure portion 39 away from the seat 40. This permits compressed air to flow through the inlet passageway 22 and the branch passageway 35 into the primary and secondary bellows chambers A and B, and consequently through the outlet passageway 24 and the conduit 36 leading to the motor of the diaphragm valve (not shown). This increased pressure in the diaphragm motor adjusts the motor diaphragm valve to the required controlling position. Due to the fact that the upper or primary bellows 8 has a greater effective area than the lower or secondary bellows 10, this increased pressure will cause a net upward force opposing the downward force of pressure in external bellows chamber C and will cause closure portion 39 to close the inlet port at seat 40, thus preventing further rise of the pressure in the outlet passageway 24. It will be recalled that the closure portion 42 on the valve stem has been in engagement with its seat 43 during this operation. Both seats 40 and 43 will be engaged by the closure portions of the valve stem, until another condition deviation is indicated by the movement of the baffle 28.

Now let it be assumed that the baffle recedes from the nozzle. The air pressure in control passageway 23 and consequently in the external bellows chamber C will be reduced. This permits the bellows unit, including the primary bellows 8 and the secondary bellows 10 to move upward. As a result of this movement, the valve stem causes its closure portion 39 to engage the seat 40 so that compressed air in the inlet passageway 22 cannot pass into the secondary bellows chamber B. However, the upward movement of the bellows unit moves the cap nut and its seat 43 away from the closure portion 42 on the valve stem. This enables compressed air in the primary and secondary bellows chambers A and B, as well as in the conduit 36 and the motor of the diaphragm motor valve (not shown), to escape through the cap nut 21. When the downward force of the pressure of the air in the external bellows chamber C exceeds the upward force of the pressure in the primary and secondary bellows chambers A and B, the bellows unit will move downward until the closure portion 42 on the valve stem engages the seat 43. This prevents the further escape of compressed air through the cap nut, a condition that prevails as long as the diaphragm valve is in the proper position to effect the desired controlling action.

I claim:

1. In a relay valve, a unit including a body and flexible means providing opposing pressure chambers, means for applying a pressure to said flexible means, a pair of valve seats on said unit defining an inlet port and an exhaust port, means including a pair of closure portions respectively cooperating with said seats to open and close said ports, said closure portions in opening said ports being movable in the direction of flow of pressure fluid therethrough, said flexible means in an intermediate position thereof operating said closure portions to close both of said ports, said flexible means on movement in one direction from said position operating to open said inlet port and to maintain said exhaust port closed while said flexible means on a movement in the other direction from said position opening said exhaust port and maintaining said inlet port closed.

2. In a relay valve, a unit including a body and flexible means providing opposing pressure chambers having different effective areas, means for supplying a pressure to said flexible means, a pair of valve seats on said unit defining an inlet port and an exhaust port, means including a pair of closure portions respectively cooperating with said seats to open and close said ports, said closure portions in opening said ports being movable in the direction of flow of pressure fluid therethrough, said flexible means in an intermediate position thereof operating said closure portions to close both of said ports, said flexible means on movement in one direction from said position operating to open said inlet port and to maintain said exhaust port closed while said flexible means on a movement in the other direction from said position opening said exhaust port and maintaining said inlet port closed.

3. In a relay valve, a valve body having two ends and at least one side surface, a primary bellows having its rim sealed to said body and providing with one end of said body a primary bellows chamber, a secondary bellows having its rim sealed to said body and providing with the other end of the body a secondary bellows chamber, said body having a passage therethrough opening through said ends whereby said primary chamber and secondary bellows chambers are in communication, a yoke movable freely through said passage and having one of its ends attached to said primary bellows and having its other end attached to said secondary bellows, said body having passages opening through the side surface thereof, one passage being an inlet for a pressure fluid, a second passage being an outlet for pressure fluid, said inlet passage communicating with said secondary bellows chamber through a valve seat on said body, said outlet passage communicating with one of the primary and secondary bellows chambers, said secondary bellows chamber having in its movable end an exhaust outlet defined by a seat, a movable valve stem having portions cooperating with the respective seats to close the openings therethrough, and means for applying a force to one of said bellows.

4. In a relay valve, a valve body having two ends and at least one side surface, a primary bellows having its rim sealed to said body and providing with one end of said body a primary bellows chamber, a cap enclosing said primary bellows and having its rim sealed to said body to provide a chamber external of said bellows, a secondary bellows having its rim sealed to said body and providing with the other end of the body a secondary bellows chamber, said body having a passage therethrough opening through said ends whereby said primary chamber and said secondary bellows chambers are in communication, a yoke movable freely through said passage and having one of its ends attached to said primary bellows and having its other end attached to said secondary bellows, said body having three passages opening through the side surface thereof, one passage being an inlet for a pressure fluid, a second passage being a control passage and a third passage being an outlet for pressure fluid, said inlet passage and said control passage being in communication through a restricted orifice, said inlet passage communicating with said secondary bellows chamber through a valve seat on said body, said control passage communicating with said external bellows chamber, said outlet passage communicating with one of the primary and secondary bellows chambers, said secondary bellows having in its movable end an exhaust outlet defined by a seat, a movable valve stem having portions cooperating with the respetive seats to close the openings therethrough.

5. In a relay valve, a valve body having two ends and at least one side surface, a primary bellows having its rim sealed to said body and providing with one end of said body a primary bellows chamber, a cap enclosing said primary bellows and having its rim sealed to said body to provide a chamber external of said bellows, a secondary bellows having its rim sealed to said body and providing with the other end of the body a secondary bellows chamber, said body having a passage therethrough opening through said ends whereby said primary chamber and said secondary bellows chambers are in communication, the effective area of said primary bellows being greater than the effective area of said secondary bellows, a yoke movable freely through said passage and having one of its ends attached to said primary bellows and having its other end attached to said secondary bellows, said body having three passages opening through said side surface thereof, one passage being an inlet for a pressure fluid, a second passage being a control passage and a third passage being an outlet for pressure fluid, said inlet passage and said control passage being in communication through a restricted orifice, said inlet passage communicating with said secondary bellows chamber through a valve seat on said body, said control passage communicating with said external bellows chamber, said outlet passage communicating with said secondary bellows chamber, said secondary bellows having in its movable end an exhaust outlet defined by a seat, a movable valve stem having portions cooperating with the respective seats to close the openings therethrough.

6. In a relay valve, a valve body having two ends and at least one side surface, a primary bellows having its rim sealed to said body and providing with one end of said body a primary bellows chamber, a cap enclosing said primary bellows and having its rim sealed to said body to provide a chamber external of said bellows, a perforated plate cooperating with closed end of said cap to provide a capacity with a restricted entrance, a secondary bellows having its rim sealed to said body and providing with the other end of the body a secondary bellows chamber, said body having a passage therethrough opening through said ends whereby said primary chamber and said secondary bellows chamber are in communication, a yoke movable freely through said passage and having one of its ends attached to said primary bellows and having its other end attached to said secondary bellows, said body having three passages opening through said side surface thereof, one passage being an inlet for a pressure fluid, a second passage being a control passage and a third passage being an outlet for pressure fluid, said inlet passage and said control passage being in communication through a restricted orifice, said inlet passage communicating with said second bellows chamber through a valve seat on said body, said control passage communicating with said external bellows chamber, said outlet passage communicating with said second bellows chamber, said second bellows having in its movable end an exhaust outlet defined by a seat, a movable valve stem having portions cooperating with the respective seats to close the openings therethrough.

7. In a relay valve, a valve body having two ends and at least one side surface, a primary bellows having its rim sealed to said body and providing with one end of said body a primary bellows chamber, a cap enclosing said primary bellows and having its rim sealed to said body to provide a chamber external for said bellows, a perforated plate cooperating with closed end of said cap to provide a capacity with restricted entrance from said external chamber, a secondary bellows having its rim sealed to said body and providing with the other end of the body a secondary bellows chamber, said body having a passage therethrough opening through said ends whereby said primary chamber and said secondary bellows chambers are in communication, the effective area of said primary bellows being greater than the effective area of said secondary bellows, a yoke movable freely through said passage and having one of its ends attached to said primary bellows and having its other end attached to said secondary bellows, said body having three passages opening through said side surface thereof, one passage being an inlet for a pressure fluid, a second passage being a control passage and a third passage being an outlet for pressure fluid, said inlet passage and said control passage being in communication through a restricted orifice, said inlet passage communicating with said second bellows chamber through a valve seat on said body, said control passage communicating with said external bellows chamber, said outlet passage communicating with said second bellows chamber, said second bellows having in its movable end an exhaust outlet defined by a seat, a movable valve stem having portions cooperating with the respective seats to close the openings therethrough.

8. In a relay valve, a valve body having two ends and at least one side surface, a primary bellows having its rim sealed to said body and providing with one end of said body a primary bellows chamber, a secondary bellows having its rim sealed to said body and providing with the other end of the body a secondary bellows chamber, a yoke movable freely through said passage and having one of its ends attached to said primary bellows and having its other end attached to said secondary bellows, said body having passages opening through the side surface thereof, one passage being an inlet for a pressure fluid, a second passage being an outlet for pressure fluid, said inlet passage communicating with said secondary bellows chamber through a valve seat on said body, said outlet passage communicating with said secondary bellows chamber, said secondary bellows having in its movable end an exhaust outlet defined by a seat, a movable valve stem having portions cooperating with the respective seats to close the openings therethrough, said valve stem portions being movable in the direction of fluid flow through said openings at said seats when uncovering said seats, means for biasing said valve stem toward said seats, and means for applying a force to one of said bellows.

9. In a relay valve, a valve body having two ends and at least one side surface, a primary bellows having its rim sealed to said body and providing with one end of said body a primary bellows chamber, a cap enclosing said primary bellows and having its rim sealed to said body to provide a chamber external of said bellows, a secondary bellows having its rim sealed to said body and providing with the other end of the body a secondary bellows chamber, a yoke movable freely through said passage and having one of its ends attached to said primary bellows and having its other end attached to said secondary bellows, said body having three passages opening through the side surface thereof, one passage being an inlet for a pressure fluid, a second passage being a control passage and a third passage being an outlet for pressure fluid, said inlet passage and said control passage being in communication through a restricted orifice, said inlet passage communicating with said secondary bellows chamber through a valve seat on said body, said control passage communicating with said external bellows chamber, said secondary bellows having in its movable end an exhaust outlet defined by a seat, a movable valve stem having portions cooperating with the respective seats to close the openings therethrough, and means for biasing said valve stem toward said seats, said valve stem portions being movable in the direction of fluid flow through said openings at said seats when uncovering said seats.

EVAN A. EDWARDS.